United States Patent
Dogan et al.

(10) Patent No.: US 11,693,103 B2
(45) Date of Patent: Jul. 4, 2023

(54) SHOOTING RANGE ESTIMATION METHOD BASED ON MISS DISTANCE AND WEAPON CALIBER PREDICTION FOR FIREARMS

(71) Applicant: ASELSAN ELEKTRONIK SAN. VE TIC. A. S., Ankara (TR)

(72) Inventors: Emir Dogan, Ankara (TR); Alper Bereketli, Ankara (TR); Mehmet Donus, Ankara (TR)

(73) Assignee: ASELSAN ELEKTRONIK SAN. VE TIC. A. S., Ankara (TR)

( * ) Notice: Subject to any disclaimer, the term of this patent is extended or adjusted under 35 U.S.C. 154(b) by 76 days.

(21) Appl. No.: 17/231,018

(22) Filed: Apr. 15, 2021

(65) Prior Publication Data

US 2021/0325522 A1   Oct. 21, 2021

(30) Foreign Application Priority Data

Apr. 17, 2020 (TR) .................... 2020/06105

(51) Int. Cl.
*G01S 11/14* (2006.01)
*F41G 3/14* (2006.01)

(52) U.S. Cl.
CPC .......... *G01S 11/14* (2013.01); *F41G 3/147* (2013.01)

(58) Field of Classification Search
CPC .................. G01S 11/14; F41G 3/147
See application file for complete search history.

(56) References Cited

U.S. PATENT DOCUMENTS

| 5,930,202 | A  | * | 7/1999  | Duckworth ........... G01S 5/20 367/906 |
| 6,178,141 | B1 |   | 1/2001  | Duckworth et al. |
| 7,408,840 | B2 |   | 8/2008  | Barger et al. |
| 8,149,649 | B1 |   | 4/2012  | Brinn et al. |
| 2007/0260407 | A1 | * | 11/2007 | Van Albert ........... F41H 1/02 702/57 |
| 2012/0314542 | A1 | * | 12/2012 | Ledeczi ............... G01S 5/22 367/118 |

FOREIGN PATENT DOCUMENTS

| CA | 2635908 C    |   | 12/2012 |
| TR | 201721987 A2 | * | 2/2018  |

OTHER PUBLICATIONS

G. B. Whitham, The Flow Pattern of a Supersonic Projectile, Communications on Pure and Applied Mathematics, 1952, pp. 301-348, vol. 5.

G. B. Whitham, On the propagation of weak shock waves, 1955, pp. 290-318.

(Continued)

*Primary Examiner* — Isam A Alsomiri
*Assistant Examiner* — Abdallah Abulaban
(74) *Attorney, Agent, or Firm* — Bayramoglu Law Offices LLC

(57) ABSTRACT

A method providing an estimation of a shooting range with high accuracy by a miss distance estimation and a weapon caliber classification following detection of shooting of firearms with supersonic bullets, and by using novel equations constructed from field shooting data for each caliber in order to ensure a security of a patrol station, a border, troops, a society, a vehicle and a convoy is provided.

5 Claims, 2 Drawing Sheets

(56) References Cited

OTHER PUBLICATIONS

G. B. Whitham, On the propagation of shock waves through regions of non-uniform area or flow, 1958, pp. 337-360.
Engineering Design Handbook Explosions in Air Part One, HeadQuarters, US Army Materiel Command, AMC Pamphlet No. 706-181, 1975.
Kevin S. Fansler, et al., A Parametric Investigation of Muzzle Blast, Army Research Laboratory, 1993, pp. 1-32.
Juan R. Aguilar, et al., Model for Small Arms Fire Muzzle Blast Wave Propagation in Air, Proceedings of SPIE, 2011, pp. 81840B-1-81840B-7, vol. 8184.

* cited by examiner

SHOOTING RANGE ESTIMATION METHOD BASED ON MISS DISTANCE AND WEAPON CALIBER PREDICTION FOR FIREARMS

CROSS REFERENCE TO THE RELATED APPLICATIONS

This application is based upon and claims priority to Turkish Patent Application No. 2020/06105 filed on Apr. 17, 2020, the entire contents of which are incorporated herein by reference.

TECHNICAL FIELD

Invention relates to a method for providing shooting range estimation for firearms based on miss distance prediction and bullet caliber classification.

Invention particularly relates to a method providing estimation of shooting range with high accuracy by means of miss distance estimation and weapon caliber (bullet diameter) classification following detection of shooting of firearms with supersonic bullets, and by using novel equations constructed from field shooting data for each caliber in order to ensure security of patrol station, border, troops, society, vehicle and convoy.

BACKGROUND

Today acoustic firing place detection systems requires muzzle blast and shock wave signs detection successfully and predictability of directions thereof. For that purpose, microphone series located at a single point or located in distributed manner are used. Acoustic signal received by microphone arrays are processed by means of various methods and prediction is made, muzzle blast and shock wave direction marks and time difference are predicted. The prediction values and sound speed are used to make range prediction. In addition to such data, some firing place detection systems also have studies aiming at prediction of bullet caliber or miss distance.

In the related art for miss distance prediction, initially some assumptions are made for bullet caliber, bullet length and bullet speed. The assumptions valid for certain conditions and bullet types cause increase in prediction errors when going beyond conditions. The signs caused by a wide diameter bullet fired from high distance and the findings of a small bullet fired from low distance may be similar. Predictions made for velocity of a bullet slowing down due to atmospheric effects may contain errors to some extent due to adverse causes such as turbulence and molecular vibrations etc. However, after making predictions for fire range based on ballistic assumptions, prediction of bullet caliber which is a ballistic parameter based on such range prediction may contain some errors.

In the range prediction methods requiring use of multiple microphone series in the related art, shock wave received by microphones and muzzle blast signs have time differences and sign coming directions are counted as input. Bullet slows down in certain distance after a certain flying time and for that reason, in particular, errors for long ranges increase. Friction coefficient in the air vary subject to bullet type and time of bullet remaining in the air varies. For that reasons, although time between shock wave and muzzle blast and incoming angle are the same, differences may occur in fire place range for different bullet types.

Most of studies in the related art are based on use of sensor units placed in distributed manner in duty field. In addition to sign processing work load at sensor units it also requires finding safe solutions for network communication and synchronization problems of units. The processing load that might occur in units increases hardware, software and data processing costs. In addition, delay encountered in respect to transfer of all data collected from units into central processor unit and processing therein decreases validity and accuracy of predictions.

Common feature of solutions needing multiple microphone series with one or more than one distributed placement is the use of complicated methods such as genetic algorithm optimization for the nearest approaching point based on multiple layer and hierarchical deep learning techniques or sign incoming time differences of microphones in respect to miss distance. Bullet caliber and fire place range.

Signal to noise ratio, SNR should be above a certain level for accurate discovery of shock wave and muzzle blast information signal start times, shock slope information or time zero transitions. In noisy environments, in case of long range firing, silence firing or vehicle noise containing mobile systems, zero transition may not occur or muzzle blast may not be discovered. Therefore, in such cases, use of range prediction methods based on shock wave and muzzle blast signs detection and prediction of directions thereof may not be solution.

When literature was searched, the following documents having above mentioned disadvantages were discovered.

The document numbered U.S. Pat. No. 5,930,202 discloses a prediction to estimate bullet caliber and miss distance by use of processing signals collected from network architecture of distributed sensors, shock wave expansion, period, exit and falling slope as well as bullet speed prediction information.

Patents numbered U.S. Pat. No. 7,408,840 and CA2635908C use a six microphones placed onto a sphere and a microphone placed in centre. Based on arrival time differences of shock waves received by microphones, the nearest approaching point is determined by use of genetic algorithm and according to it range prediction is made. The patents do not disclose any information about caliber estimation.

In document numbered U.S. Pat. No. 8,149,649 only one system is used to determine shock wave signal and pressure differences of signals in minimum five microphones and arrival time differences are used to predict range. The nearest approaching point of the two alternative bulled trajectory obtained from shock wave signal is estimated and trajectory is determined. Muzzle signal is to be heard in order to enhance accuracy of prediction. For caliber prediction shock wave pressure levels at minimum five microphones, their arrival times, signal amplitude and time must be measured.

Patent document numbered U.S. Pat. No. 6,178,141 uses at least six sensors located in distributed manner in at least two tetrahedral series or region with four microphones located on both sides of the area to be protected. Shock wave arrival times of the units are used to estimate miss distance and bullet velocity. For caliber estimation, shock wave amplitude and slope and field data are used in the equations developed for it. Range prediction in this study is made based on arrival times of shock and muzzle signals and signal direction predictions.

As a result, due to above described disadvantages and inadequacy of existing solutions, it has been necessary to make development in the related art.

SUMMARY

The invention has been developed with inspiration from existing situation and aims to eliminate the above mentioned disadvantages.

Main aim of the invention is to disclose a method to provide estimation of miss distance, weapon bullet caliber and shooting location distance at high accuracy by use of original equations achieved by applying optimization methods to minimize errors in predictions into field data collected as a result of several shooting without need for any parameter adjustment or preliminary information.

Another aim of the invention is to provide use of only shock wave signal for estimation of miss distance and weapon caliber as muzzle blast signal weakens considerably upon increasing shooting location range and causes low SNR level detection and prediction errors. Thus it is targeted to enhance prediction safety.

A further aim of the invention is to provide miss distance weapon caliber and range predictions in various applications, systems and use scenarios by means of disclosing a method independent of serial geometry and number of microphones.

Another aim of the invention is to provide a range prediction with high accuracy rate even with use of one single microphone.

A further aim of the invention is to enable conduct of miss distance, weapon caliber and shooting location range predictions in one single detectors and thus eliminate network installation problems. Thus network communication, synchronization timing, additional process load, delay and cost issues are eliminated.

In order to achieve above mentioned aims, the invention is a method for prediction of shooting location range by means of at least one microphone detection of acoustic signals of shooting made by supersonic bullets by fire arms and characterized by comprising process steps of
  detection of shock wave and muzzle blast,
  estimation of arrival time difference between detected shock wave and muzzle blast,
  estimation of miss distance,
  bullet caliber estimation,
  estimation of shooting range by use of time difference calculated between shock wave and muzzle blast, said miss distance prediction and weapon caliber prediction.

The structural and characteristics features of the invention and all advantages will be understood better in detailed descriptions with the figures given below and with reference to the figures, and therefore, the assessment should be made taking into account the said figures and detailed explanations.

DETAILED DESCRIPTION OF THE EMBODIMENTS INVENTION

Figure 1:
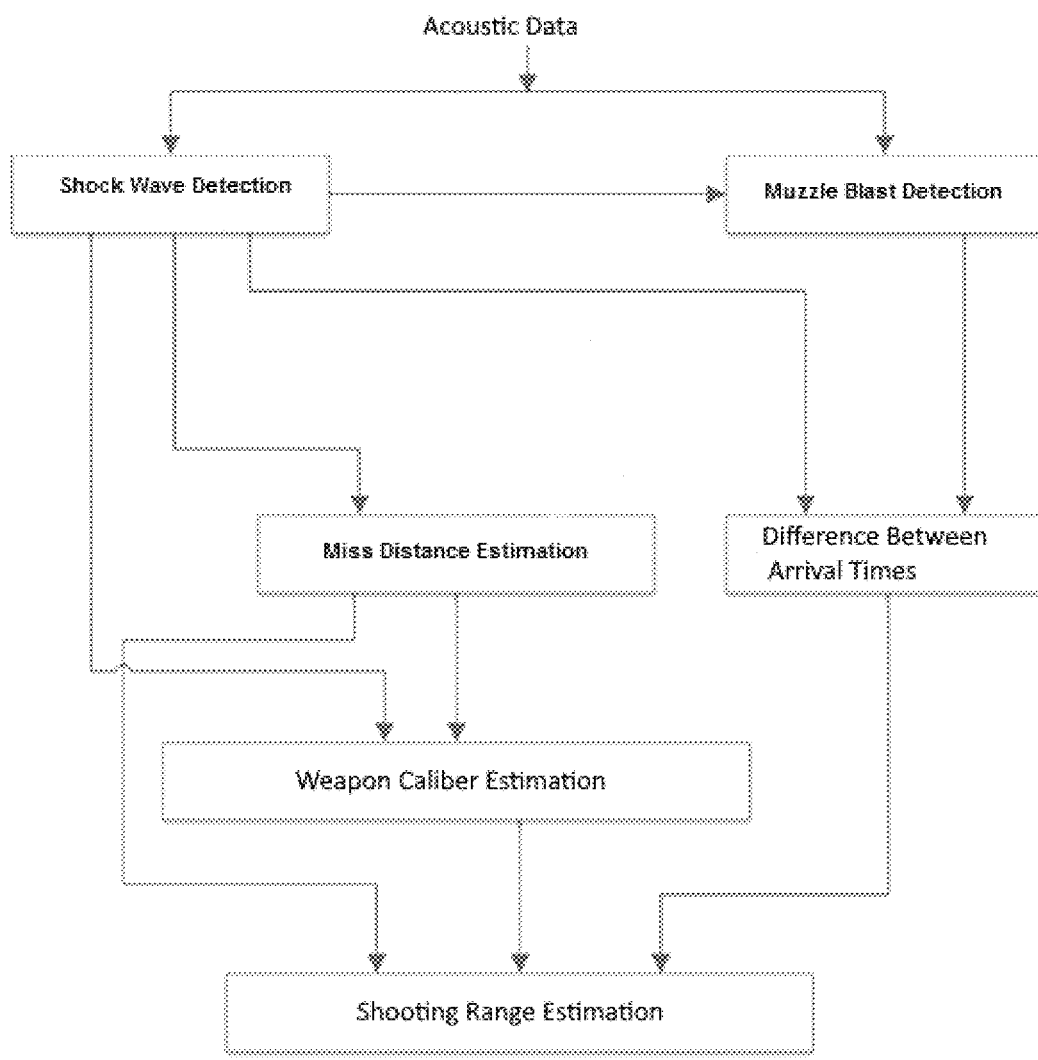
FIG. 1 is a flow diagram of shooting location range prediction method of the invention.

In this detailed description, the preferred embodiments of the shooting range estimation method being subject of the invention have been described only for purpose of better understanding of the matter.

The invention is a method for estimation of shooting range by means of detection of "acoustic signals from shooting of firearms with supersonic bullets" by at least one microphone without need for any parameter adjustment or preliminary information and characterized by comprising process steps of
  detection of shock wave and muzzle blast,
  estimation of arrival time difference between detected shock wave and muzzle blast,
  estimation of miss distance,
  bullet caliber estimation,
  estimation of shooting range by using the calculated time difference between shock wave and muzzle blast, miss distance prediction and bullet caliber estimation.

The invention also comprises process steps of detection of shock wave by checking incoming acoustic data and Whitham shock wave model cross-correlation output and detection of central frequency of shock wave by use of Fast Fourier Transform (FFT) method. Also it comprises process step of obtaining muzzle blast detection by checking cross-correlation output of Friedlander muzzle blast model.

The method for prediction of miss distance for shooting range estimation of the invention comprises process steps of estimation of bullet caliber by comparison of "shock signal frequency" with "miss frequency information" estimated by process step of estimation of the shortest distance between bullet direction and detection unit comprising at least one microphone by use of shock signal slope, bullet speed and sound speed.

The invention is a method to be used for estimation of miss distance, weapon bullet caliber and range for shootings of firearms with supersonic bullets. The method disclosed hereunder can be used for purposes such as patrol station security, vehicle and convoy security, border security unit security, society security and public security.

Input of the method is the acoustic signals received by detector microphones. Signals received by microphones are detected by cross correlation method in shock wave and muzzle blast detection blocks. Also shock wave detection block calculates shock wave central frequency ($f_{sw}$) by FFT. Time difference ($\Delta T$) between shock wave and muzzle blast signals is estimated as follows;

$$\Delta T = t_{mb} - t_{sw}$$

Here $t_{mb}$ refers to muzzle blast detection time, and $t_{sw}$ refers to shock wave detection time.

Miss distance prediction yields shooting direction and trajectory information. Particularly, information on what is targeted by the shooter in the unit or vehicle convoy is obtained. In miss distance prediction block, bullet speed, sound speed and shock wave signal slope are used as inputs. Here bullet speed ($v_0$=800 m/s) is taken as constant value Sound speed (c) is estimated by use of following formula subject to measured environment temperature ($T_c$).

$$c = 331 + 0.6\, T_c$$

Figure 2:
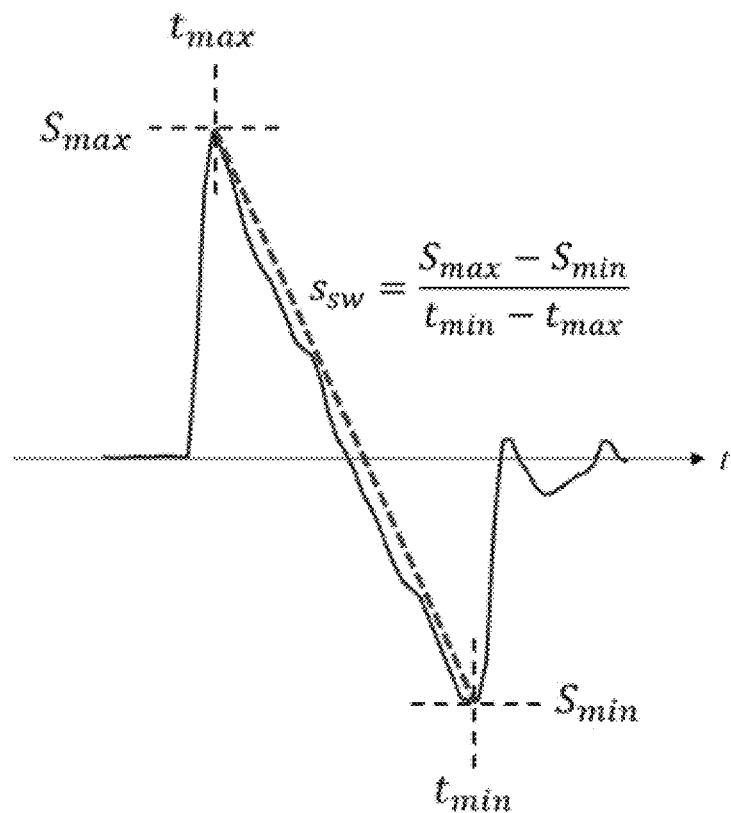
FIG. 2 is a graphic indicating minimum and maximum times of signal power for shock wave.

For the shock wave signal shown in FIG. 2 $S_{max}$ shows the maximum signal power, $S_{min}$ is the minimum signal power, $t_{max}$ is the time when signal power is maximum and $t_{min}$ is the time when signal power is minimum. Accordingly, the expression giving the slope of the shock wave signal ($s_{sw}$) is as follows, $$s_{sw} = \frac{s_{max} - s_{min}}{t_{min} - t_{max}}$$

After sound speed, bullet speed and shock wave signal slope are obtained, miss distance estimation ($d_{miss}$) is calculated by following equation, $$d_{miss} = k_1 \sqrt{\left[\left(\frac{v_0}{c}\right)^2 - 1\right]} \frac{c^2}{v_0} \frac{1}{s_{sw}}$$

Here $k_1$ refers to a fixed coefficient, $v_0$ is the bullet speed, c refers to the sound speed, $s_{sw}$ is the shock wave signal slope.

The obtained miss distance prediction is used for miss frequency determination ($f_{miss}$) using a third degree equation.

$$f_{miss} = a_0 + a_1 d_{miss} + a_2 d_{miss}^2 + a_3 d_{miss}^3$$

Here $d_{miss}$ refers to the estimated miss distance and, $\alpha_0$, $\alpha_1$, $\alpha_2$, and $\alpha_3$ are fixed coefficients.

Successful estimation of weapon caliber provides correct prediction of threat potential, enables correct counter-measures against shooting, and helps accurate tactical decisions to be determined with high accuracy. Bullet caliber estimation in multiple shooting scenario helps taking primarily measure against heavy weapons. Also weapon caliber estimation is used as input to minimize error rate in range estimation and to make required updating. The calculated miss distance frequency ($f_{miss}$) and shock signal frequency ($f_{sw}$), are compared in as follows in weapon caliber estimation block and weapon caliber estimation (cal) is made $$cal = \begin{cases} 12.7 \text{ mm}; f_{sw} < f_{miss} - 300 \\ 5.56 \text{ mm}; f_{sw} > f_{miss} + 300 \\ 7.62 \text{ mm}; |f_{sw} - f_{miss}| \leq 300 \end{cases}$$

Here weapon caliber estimation is made as 5.56 mm, 7.62 mm and 12.7 mm by means of comparing conditions, and thus weapon can be classified.

Using weapon bullet caliber estimation (cal) miss distance prediction ($d_{miss}$) and time difference between shock wave and muzzle blast signals ($\Delta T$), shooting range estimation (R) is obtained by using the following equation based on conditions specified subject to time difference and caliber values, $$B = \begin{cases} r_0 + d_{miss} + r_1 \Delta T + r_2 \Delta T^2; \text{cal} = 7.62 \text{ mm}, \Delta T > 0.2 \text{ s} \\ r_3 + d_{miss} + r_4 \Delta T + r_5 \Delta T^2; \text{cal} = 12.7 \text{ mm}, \Delta T > 0.2 \text{ s} \\ d_{miss} + r_6 \Delta T + r_7 \Delta T^2; \text{cal} = 5.56 \text{ mm}, \Delta T > 0.2 \text{ s} \\ r_R d_{miss} + r_9 \Delta T; \Delta T \leq 0.2 \text{ s} \end{cases}$$

Here $r_0$, $r_1$, $r_2$, $r_3$, $r_4$, $r_5$, $r_6$, $r_7$, $r_8$ and $r_9$ are fixed coefficients determined according to field data.

What is claimed is:

1. A method for prediction of a shooting range by a detection of acoustic signals from shooting of firearms with supersonic bullets by at least one microphone without need for any parameter adjustment or preliminary information, comprising the process steps of:
   detection of a shock wave and a muzzle blast from the detected acoustic signals,
   calculation of a shock wave central frequency by using a Fast Fourier Transform method
   estimation of an arrival time difference between the shock wave and the muzzle blast,
   estimation of a miss distance based on bullet speed, sound speed and shock wave signal slope,
   estimation of a bullet caliber based on the miss distance frequency and the shock wave central frequency,
   estimation of the shooting range by use of the arrival time difference calculated between the shock wave and the muzzle blast, the miss distance prediction and the weapon caliber prediction,
   wherein the shock wave signal slope can be calculated by dividing a difference between maximum signal power and minimum signal power by a difference between a time in which the signal power is minimum and a time in which the signal power is maximum.

2. A method for prediction of a shooting range by a detection of acoustic signals from shooting of firearms with supersonic bullets by at least one microphone without need for any parameter adjustment or preliminary information, comprising the process steps of:
   detection of a shock wave and a muzzle blast from the detected acoustic signals,
   calculation of a shock wave central frequency by using a Fast Fourier Transform method
   estimation of an arrival time difference between the shock wave and the muzzle blast,
   estimation of a miss distance based on bullet speed, sound speed and shock wave signal slope,
   estimation of a bullet caliber based on the miss distance frequency and the shock wave central frequency,
   estimation of the shooting range by use of the arrival time difference calculated between the shock wave and the muzzle blast, the miss distance prediction and the weapon caliber prediction,
   wherein the miss distance can be calculated according to formula below;

$$d_{miss} = k_1 \sqrt{\left[\left(\frac{v_0}{c}\right)^2 - 1\right]} \frac{c^2}{v_0} \frac{1}{s_{sw}}$$

wherein; "$d_{miss}$" is the miss distance, "$k_1$" is a fixed coefficient, "$v_0$" is a bullet speed of constant 800 m/s, "c" is a sound speed and "$s_{sw}$" is the shock wave signal slope.

3. A method for prediction of a shooting range by a detection of acoustic signals from shooting of firearms with supersonic bullets by at least one microphone without need for any parameter adjustment or preliminary information, comprising the process steps of:
   detection of a shock wave and a muzzle blast from the detected acoustic signals,
   calculation of a shock wave central frequency by using a Fast Fourier Transform method
   estimation of an arrival time difference between the shock wave and the muzzle blast, estimation of a miss distance based on bullet speed, sound speed and shock wave signal slope, estimation of a bullet caliber based on the miss distance frequency and the shock wave central frequency, estimation of the shooting range by use of the arrival time difference calculated between the shock wave and the muzzle blast, the miss distance prediction and the weapon caliber prediction, wherein a miss frequency can be calculated according to formula below;

$$f_{miss} = a_0 + a_1 d_{miss} + a_2 d_{miss}^2 + a_3 d_{miss}^3$$

wherein; "$f_{miss}$" is the miss frequency, "$\alpha_0, \alpha_1, \alpha_2, \alpha_3$" are the fixed coefficients and "$d_{miss}$" is the miss distance.

4. The method according to claim 1, wherein the bullet caliber estimation can be performed according to below equation:

$$cal = \begin{cases} 12.7 \text{ mm}; f_{sw} < f_{miss} - 300 \\ 5.56 \text{ mm}; f_{sw} > f_{miss} + 300 \\ 7.62 \text{ mm}; |f_{sw} - f_{miss}| \le 300 \end{cases}$$

wherein; "cal" is the bullet caliber, "$f_{sw}$" is the frequency of the shock wave signal and "$f_{miss}$" is the frequency of the miss distance.

5. The method according to claim 1, wherein the shooting range estimation is obtained by using the following equation based on conditions specified subject to the arrival time difference between the shock wave and the muzzle blast and caliber estimation:

$$R = \begin{cases} r_0 + d_{miss} + r_1 \Delta T + r_2 \Delta T^2; \text{cal} = 7.62 \text{ mm}, \Delta T > 0.2 \text{ s} \\ r_3 + d_{miss} + r_4 \Delta T + r_5 \Delta T^2; \text{cal} = 12.7 \text{ mm}, \Delta T > 0.2 \text{ s} \\ d_{miss} + r_6 \Delta T + r_7 \Delta T^2; \text{cal} = 5.56 \text{ mm}, \Delta T > 0.2 \text{ s} \\ r_8 d_{miss} + r_9 \Delta T; \Delta T \le 0.2 \text{ s} \end{cases}$$

wherein; "R" is the shooting range, "$r_0, r_1, r_2, r_3, r_4, r_5, r_6, r_7, r_8, r_9$" are fixed coefficients determined according to field data, "$d_{miss}$" is the miss distance, "$\Delta T$" is the arrival time difference between the shock wave and the muzzle blast and "cal" is the estimated bullet caliber.

* * * * *